United States Patent [19]

Moriya

[11] Patent Number: 5,040,160
[45] Date of Patent: Aug. 13, 1991

[54] DISK AND CLEANER CHIP FOR CLEANING OPTICAL HEADS

[75] Inventor: Kenichi Moriya, Tokyo, Japan

[73] Assignee: Toho Kogyo Co., Ltd., Tokyo, Japan

[21] Appl. No.: 332,059

[22] Filed: Apr. 3, 1989

[30] Foreign Application Priority Data

Apr. 3, 1988 [JP] Japan .................. 63-45131[U]

[51] Int. Cl.⁵ .................. F11B 3/58; G11B 23/02
[52] U.S. Cl. .................. 369/71; 369/72; 360/128; 360/133
[58] Field of Search .................. 369/71, 72; 206/444; 360/128, 133, 86, 99.01, 137, 97.04; 15/210 R

[56] References Cited

U.S. PATENT DOCUMENTS

| | | | |
|---|---|---|---|
| 4,490,765 | 12/1984 | Nakamats | 360/133 |
| 4,503,473 | 3/1985 | Eyler et al. | 360/133 X |
| 4,520,470 | 5/1985 | d'Alayerde Costemore d'Ave | 369/72 |
| 4,558,386 | 12/1985 | Kara | 360/133 X |
| 4,586,100 | 4/1986 | Howe et al. | 360/137 X |
| 4,682,257 | 7/1987 | Neuman | 360/133 X |
| 4,734,815 | 3/1988 | Naganawa et al. | 360/133 |
| 4,870,636 | 9/1989 | Yamamoto | 360/128 X |
| 4,916,564 | 4/1990 | Fritsch | 360/137 X |

FOREIGN PATENT DOCUMENTS 8200731 3/1982 World Int. Prop. O. .......... 360/128

*Primary Examiner*—Paul Ip
*Attorney, Agent, or Firm*—Oblon, Spivak, McClelland, Maier & Neustadt

[57] ABSTRACT

Cleaning disk of this invention contains a circular shaped body substantially identical to those of a recording optical disk and a detachable cleaner chip having a band-like cloth inserted through the notched grooves, the cleaning disk being formed with a round through hole at the position devated from the center thereof the cleaner chip being snapped in to said round through hole of said body. The cleaning disk is mounted on an optical disk system, the optical head is cleaned by the system actuation.

2 Claims, 3 Drawing Sheets

DISK AND CLEANER CHIP FOR CLEANING OPTICAL HEADS

DETAILED DESCRIPTION OF THE INVENTION

1. Applicable Industrial Field

This invention relates to the field of optical disk system which reads-in or writes-out information by an optical head on recording/reproducing optical disks such as CDs (compact disks), and more particularly to a disk for cleaning such optical disks which removes dust and stains adhering to the optical heads thereof and a cleaner chip which is mounted on the cleaning disk in a freely attachable/detachable manner.

2. Prior Art

Conventional cleaning disks for optical heads of this type are shaped identically to the recording/reproducing optical disks and are provided on the surface a cleaning member implanted with hair-like bristles. When such cleaning disk is mounted on an optical disk system in a manner similar to the recording/reproducing disks and the system is actuated, the optical head is cleaned by the radius movement of the optical head and the rotation of the cleaning disk, or more particularly by the contact of said brush-like cleaning member with the optical head.

The prior art cleaning member of brush type with hairs comprises, as shown in FIG. 8, a circular or polygonal base 17 which is implanted with fine hairs or bristles 18 on one surface thereof, and a pair of pins 19, 20 erected from the other surface thereof. The pins are inserted into narrow pin holes bored on a cleaning disk 21 and the tip ends thereof are bent on the rear face of the disk 21a for fixing. Alternatively, the cleaning member with the bristles is pasted with adhesives on a cleaning disk at a predetermined position.

PROBLEMS TO BE SOLVED BY THE INVENTION

As the prior art optical head cleaning disk cleans optical heads by wiping the heads with hair-like bristles implanted on the surface of the cleaning member, the hairs or bristles tend to become sticky with dust after use for some time, and to damage the optical heads. The cleaning disk, therefore, should be replaced with a new one after a certain number of uses, but as it is caulked by bent pins over the surface of the cleaning disk or pasted thereon with adhesives, users cannot readily detach the cleaning member alone and have to replace the cleaning disk as a whole. Even though the cleaning disk per se is not damaged and can still be used, it must be replaced to thereby push up the cost.

This invention was conceived to eliminate the problems encountered in the prior art and aims to provide a cleaner chip with a special band-like cloth which does not become sticky as was the case in the prior art brush with fine and short hairs.

Another object of this invention is to provide a disk for cleaning optical heads which can easily be attached with or detached from above-mentioned cleaner chip, and which allows replacement of the cloth or the cleaner chip alone without the necessity of replacing the disk per se, when the cloth is stained.

Still another object of this invention is to provide a disk for cleaning optical heads which can be positioned and mounted on a system in a manner that a cleaner chip thereof is exposed in the same level as the surface of said disk which faces the optical head and said cloth alone projects from the surface and a cleaner chip therefor which is attachable/detachable as well as replaceable.

MEANS TO SOLVE THE PROBLEMS

The cleaner chip according to this invention comprises a round inner piece with a pair of notched grooves, a round outer piece which has an annular projection on one surface and a flange of a diameter larger than that of said annular projection on the other surface, and a band-like cleaning cloth which is inserted through said notched grooves of said round inner piece to extend both ends thereof over the plane surface of said inner pieces. Said band-like cleaning cloth is attached on said round inner piece, and then said inner piece is mounted on inner periphery of said annular projection of said round outer piece.

The disk for cleaning optical head according to this invention has inner and outer diameters and a shape which are substantially identical to those of a recording/reproducing optical disk. A through hole is bored at a position deviated from the center of the disk by a predetermined distance so that said cleaner chip can be mounted in a freely attachable/detachable fashion by fitting in the hole the outer periphery of the annular projection of the round outer piece. More particularly, said cleaner chip is attached on said disk from the surface not facing the optical head or the rear surface of the disk. The height of said annular projection and the thickness of the round inner piece are so determined that when the flange on the other surface of the round outer piece outside of said annular projection is abutted against the rear surface of the disk, the end of the annular projection and the exposed surface of said round inner piece become positioned on the same level as the surface of said disk facing the optical head.

EMBODIMENT

Preferred embodiment of this invention will now be described referring to attached drawings.

BRIEF DESCRIPTION OF THE DRAWINGS

Figure 1:
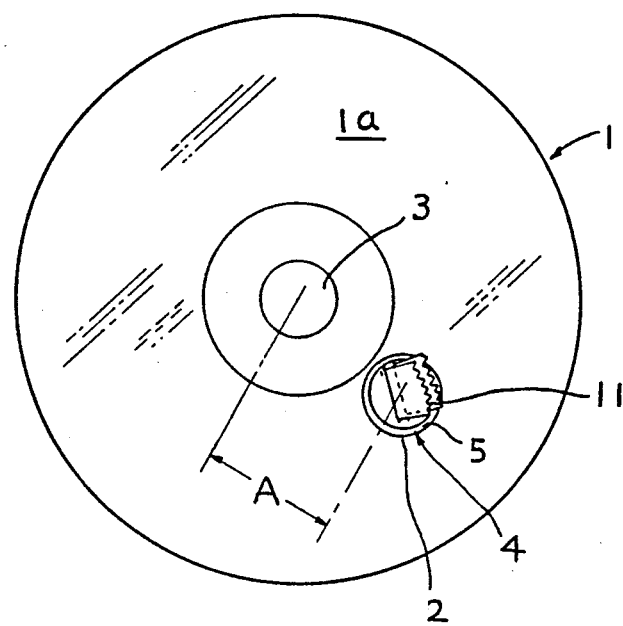
FIG. 1 is a plane view of the cleaning disk according to this invention.
Figure 2:
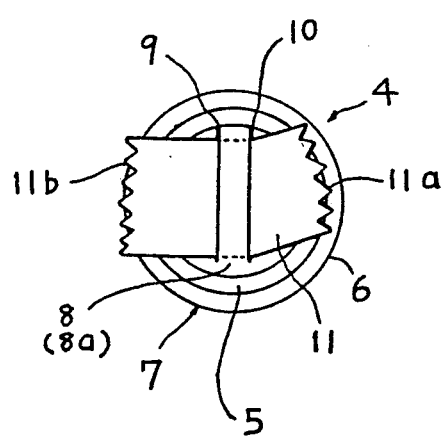
FIGS. 2 and 3 are a plane view and a side view of a cleaner chip according to this invention respectively.
Figure 3:
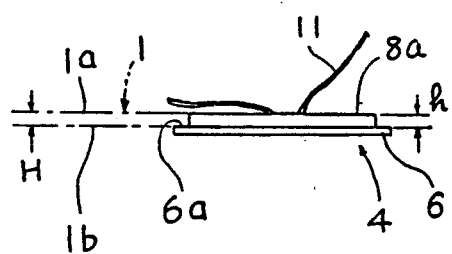
Figure 4:
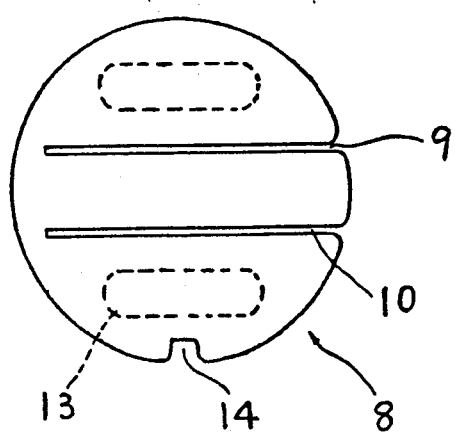
FIGS. 4 and 5 are a plane view and a side view of a round inner piece.

Referring to FIGS. 1 through 3, an embodiment of this invention will briefly be described. The cleaning disk according to this invention is shaped circular with the outer and inner diameters and the thickness substantially identical to those of a recording optical disk (not shown), and has a round through hole 2 at a position deviated from the center thereof by a predetermined distance A for press-fitting a cleaner chip 4 (which will be described hereinafter). The reference numeral 3 denotes a central hole for mounting a disk body 1 onto an optical disk system (not shown). The cleaner chip 4 comprises a round outer piece 7 provided with an annular projection 5 and a rear surface flange 6, a round inner piece 8 which is fit on the inner periphery of said annular projection 5, and a soft band-like cloth piece 11 mounted on said piece 8 in a manner to be inserted through a pair of notched grooves 9, 10. The cloth piece 11 has a length in the embodiment shown in the figure to allow both ends thereof 11a, 11b, to almost reach over the outer periphery of the round outer piece 7. The piece 11 is serrated on both ends as shown in the figure. However, the piece 11 does not have to be cut in serration but may be cut straight. The cleaner chip 4 shown in FIG. 2 and thereafter is illustrated in a greater magnification than that of the outer periphery of the disk for cleaning optical chip shown in FIG. 1.

The height h of the annular projection 5 (the height from the rear surface flange 6) at the outer periphery of the round piece 7 is determined to be substantially the same as the thickness H of the disk body 1. Therefore, when the cleaner chip 4 is fit in the round hole 2 from the rear surface of the disk body 1 or the surface not facing an optical head (not shown), the inner surface 6a of the flange 6 of the outer piece 7 comes to abut against the rear surface 1b of the disk body 1, and the tip end surface of the annular projection 5 of the cleaner chip 4 and the surface 8a of the round piece 8 facing the optical head come to be positioned on the same level as the surface 1a of the piece 8 facing the optical head. Accordingly, the rear surface flange 6 of the cleaner chip 4 functions as a positioning means. Further, the cleaner chip 4 would not come out of surface 1a of the disk body 1 once the chip 4 is inserted into the central hole 2 from the other surface 1b thereof to thereby greatly facilitate mounting and inserting. This invention cleaning disk for optical heads can be assembled by mounting the cleaner chip 4 on the disk body. When the disk is mounted in an optical disk system in place of a recording/reproducing optical disk and actuated, the band-like cloth 11 which extends from the round inner piece 8 lightly touches and sweeps over the optical head to clean dust and stains on the head surface. The cleaner chip 4 is snapped-in to the disk body 1 in a predetermined direction so that the cloth portion of the band-like piece 11 passes over the position of the head in a direction perpendicular to the optical head.

When the band-like cloth 11 is stained after a certain number of uses of the disk 1, the round outer piece 7 of the chip would become readily detached from the round hole 2 of the disk body 1 simply by pushing the cleaner chip 4 from the side of projection toward the rear surface of the disk body with fingers, and can be replaced with a new clean chip. The attachment/detachment of a cleaner chip can be made with one-touch action of fingers.

Figure 5:
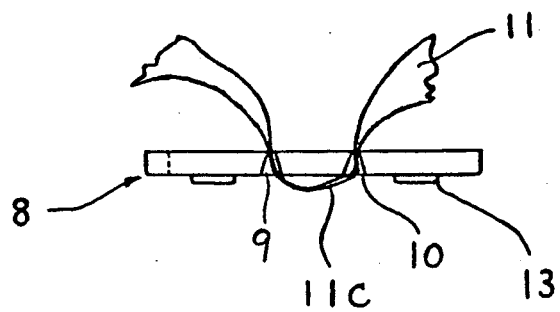
Figure 6:
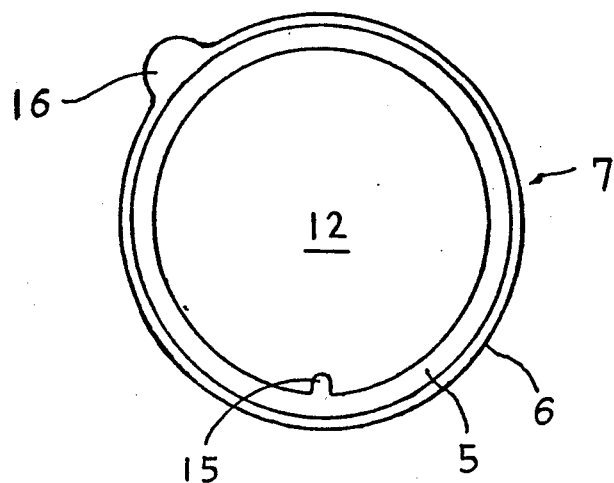
FIGS. 6 and 7 are a plane view and a cross sectional view of a round outer piece and FIG. 8 is a partial cross sectional view of the prior art disk for cleaning optical heads.
Figure 7:
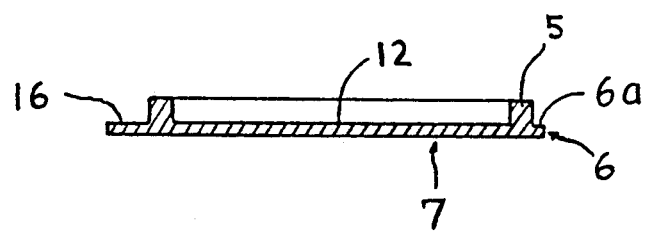
Figure 8:
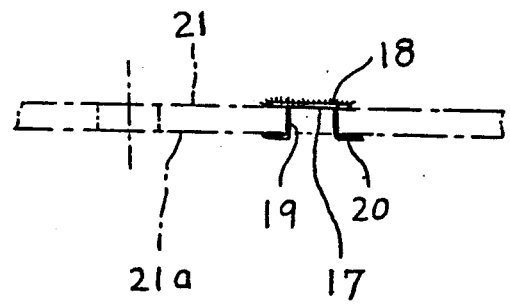

The round inner piece 8 is notched to form grooves 9, 10 in parallel to each other in a length slightly shorter than the diameter of the piece 8. As shown in FIG. 5, the band-like cloth piece 11 is inserted through the grooves as if to roll into one groove and roll out of the other groove. In order to absorb the extra thickness made by the rolled-in portion of the band-like cloth on the bottom surface 12 of the piece 7 and in order to stabilize said inner piece 8 when the two round inner and outer pieces 7, 8 are engaged to each other, projections 13 are formed on the rear surface of the piece 8. The side of the round inner piece 8 is cut to form a notch 14 at a position and in the direction corresponding to the grooves 9, 10. The inner wall of the annular projection 5 of the piece 7 is formed with projection 15 in a manner to correspond to the above-mentioned notch, and another projection 16 is formed on the flange on the outer-periphery of the round outer piece 7 for positioning correspondingly to these notch 14 and projection 15. The cleaner chip 4 is fit in the disk body 1 by registering said notch 14 with projection 15, fitting the two pieces 8, 7, and referring to the positioning projection 16 to precisely determine the direction of the band-like cloth 11 in respect of the disk body 1 or in other words in respect of the optical head. It therefore becomes possible to easily attach the chip even by handling the chip from the rear surface alone. The inner and outer pieces 7, 8 are fixed to each other with adhesives in the above instance, but the attachment is not necessarily achieved with adhesives but may be attained simply by fitting them tightly. When attached in such a manner, they may be detached from each other forcibly by using the extended band-like cloth 11 without damaging it. When only the band-like cloth is stained, the cloth alone can be replaced with a new on and the remaining parts are used as they are.

Effect of the Invention

As described in detail, as a band-like special cloth is used flappingly to clean heads according to this invention, the cleaning means would not become sticky as is often seen in the prior art fine-hair brush type cleaner. Moreover, as the cloth piece alone projects from the disk surface, it does not damage the optical head. When the cloth becomes dirty, the cleaner chip alone can be replaced with a new one by a simple one-touch action. Compared to the prior art cleaning disk which must be replaced as a whole, this invention cleaning disk is less wasteful and more economical. This invention is therefore remarkably effective.

What is claimed is:

1. A disk for cleaning optical heads including a cleaner chip which comprises a round inner piece notched to form a pair of grooves, a round outer piece formed with annular projection on one surface thereof and with a flange of a diameter larger than an outer diameter of said annular projection, and a band-like cloth inserted through said notched grooves of said round inner piece and extending to cover a surface of said inner piece with both ends thereof, the cleaner chip being assembled by attaching said band-like cloth in said round inner piece, and mounting said round inner piece with said cloth onto an inner periphery of said annular projection of said round outer piece, which is characterized in that a main body of the disk has outer and inner diameters and shape substantially identical to those of a recording/reproducing disk, and a round through hole is bored on a surface of the disk main body at a position deviated from a center thereof by a predetermined distance so that said cleaner chip may be fit in the through hole of said disk main body to make an outer periphery of the annular projection of the round outer piece engaged with the hole in a freely attachable/detachable fashion.

2. A cleaner chip comprising a round inner piece formed with a pair of notched grooves, a round outer piece formed with an annular projection on one surface and with a flange of a diameter larger than that of said annular projection on an other surface, and a band-like cloth inserted through said notched grooves of said round inner piece and extending to cover a surface of said inner piece with both ends, which is characterized in that said round piece is engaged with an inner periphery of said annular projection of said round outer piece as said band-like cloth is inserted in said round inner piece.

* * * * *